Jan. 20, 1970 K. L. HUJSAK ET AL Re. 26,773
PRODUCING PETROLEUM BY FORWARD COMBUSTION
AND CYCLIC STEAM INJECTION
Original Filed Nov. 19, 1965
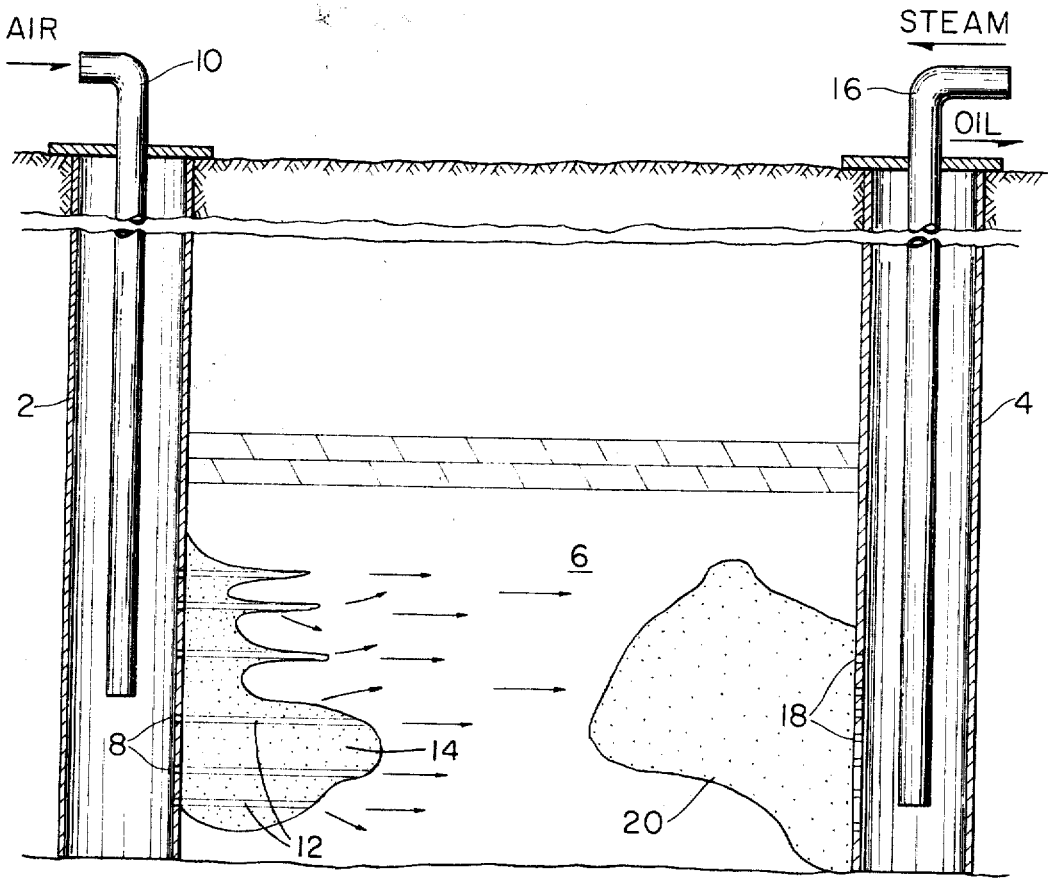
RICHARD MUNGEN
HOWARD GREKEL
KAROL L. HUJSAK
INVENTOR.
BY Arthur McKlay
ATTORNEY United States Patent Office Re. 26,773
Reissued Jan. 20, 1970

26,773

PRODUCING PETROLEUM BY FORWARD COMBUSTION AND CYCLIC STEAM INJECTION

Karol L. Hujsak, Tulsa, Howard Grekel, Claremore, and Richard Mungen, Tulsa, Okla., assignors to Pan American Petroleum Corporation, Tulsa, Okla., a corporation of Delaware Original No. 3,384,172, dated May 21, 1968, Ser. No. 508,790, Nov. 19, 1965. Application for reissue Aug. 28, 1968, Ser. No. 760,386

Int. Cl. E21b *43/24*

U.S. Cl. 166—259 18 Claims

Matter enclosed in heavy brackets [ ] appears in the original patent but forms no part of this reissue specification; matter printed in italics indicates the additions made by reissue.

ABSTRACT OF THE DISCLOSURE

For producing tar sands or other heavy oil reservoirs, a forward combustion drive is used, and wells around injection well are produced by cyclic steam injection.

The present invention relates to a novel thermal method for the recovery of tars and heavy oil from underground deposits thereof. More particularly, it is concerned with a novel combination of processing steps for securing increased oil recovery from deposits of the type contemplated herein.

Briefly, the process of our invention embodies the utilization of a combination of alternate steam injection and producing cycles at the production well or wells and forward combustion under novel conditions at the injection well or wells.

Single well steam injection followed by a depressuring step accompanied by production has been in use for some time as a means for producing the heavier oils from relatively shallow, thick formations. This procedure is frequently referred to as the cyclic or "huff and puff" method. While it is possible to recover additional oil from such deposits by this procedure, it has not met with unqualified successs—one of the principal drawbacks being that it does not supply the reservoir with sufficient energy to move the oil toward the producing well in the quantities it should. This process is generally used in reservoirs having little or no energy and hence, any oil moving to the producing well largely depends for its energy on that furnished by flash vaporization of hot condensate back in the formation when the producing well is depressurized and placed on production.

Forward combustion, of course, is a technique that has been known for many years but up to the time of the present invention—insofar as we are aware—has been considered to be limited to reservoirs containing oils having an API gravity of from about 20° to 40°. It has been the common conception that forward combustion could not be effected in reservoirs containing heavy viscous oils and the like because the cold reservoir rock yielding the oil lies just ahead of the combustion zone. At the combustion zone the viscosity of the oil is at a minimum. However, as the pressure of the system forces the oil toward the producing well, the oil decreases in temperature to that of the unburned portion of the reservoir. Eventually, it was thought, resistance to flow was so great that combustion could no longer continue because it was impossible to supply air at a satisfactory rate to sustain combustion. Under the conditions of forward combustion previously used, the foregoing appraisal of the process is probably accurate.

Accordingly, it is an object of our invention to provide a method for carrying out forward combustion in reservoirs containing heavy oils or tars by subjecting such reservoirs to air injection above the overburden pressure, thus creating fractures or channels of sufficient size to permit the flow of air in amounts adequate to sustain forward combustion. It is another object of our invention to provide a method applicable to the recovery of tars, as well as oils of any viscosity, present in a reservoir having essentially no natural energy. It is a further object of our invention to provide a method for heating, by means of forward combustion, oil bearing reservoirs formerly considered unadaptable to combustion by such technique. It is still another object of our invention to provide a method by which additional energy can be supplied to the reservoir in a manner such as to increase the efficiency of the two-cycle steam injection process to which we have previously referred.

In accordance with an embodiment of our invention, we have found that the foregoing objects can be accomplished by a combination of steps involving first forming a combustion zone in an injection well penetrating, for example, a formation containing a heavy crude oil. After a burning zone has been established, air or the equivalent is introduced into the formation via the ignited injection well under a pressure sufficient to lift the overburden or fracture the formation. Before, after, or during this operation, steam injection in an offset producing well is started. Generally this steam is wet or low grade and may be at a pressure of from about 500 to 1500 p.s.i. and at a temperature of from about 470° to 600° F. Ordinarily we prefer—after the combustion step has been carried out long enough to establish a good heat bank—to suspend the flow of air into the injection well while steam is introduced into the formation via the producing well. During this latter step the injection well is preferably shut in and inert gaseous combustion products remain in the formation. After the steam injection step is completed, which may extend from one to several weeks, the producing well is depressured thus allowing the pressure in the entire system to be decreased. At this time, oil of substantially reduced viscosity in the vicinity of the producing well is forced toward the latter not only as a result of the pressure generated by revaporization of condensate back in the formation when the producing well is opened, but by the accumulated mass of hot inert gaseous combustion products from the forward burning step. If desired, the introduction of air into the formation via the injection well need not be discontinued during the steam injection cycle. However, if air injection and combustion are continued, there may be some tendency for the oil to bypass the producing well.

It will be appreciated that the process of our invention also contemplates the application thereof to oil-bearing reservoirs that not only have very little, if any, energy, but which contain higher API gravity crudes, e.g., 25° to 40°. The additional energy afforded by the gaseous products from the combustion step, of course, serves to force such oil toward the producing well in the same fashion as mentioned above with regard to the heavier crudes. This, together with energy provided from steam injection as previously described, results in improved recovery of oil from the so-called "dead" reservoirs, i.e., formation pressures below 150 p.s.i.

Similarly, it is to be understood that we have provided a method for supplying heat to a heavy oil-containing reservoir by means of the aforesaid high pressure forward combustion step which serves to condition such a reservoir for further treatment by conventional methods, such as ordinary (low pressure) forward combustion, combustion involving simultaneous air and water injection, various fluid-flooding techniques, and the like. This heating step is accomplished merely by injecting air at pressures sufficient to lift the overburden after a combustion front has been established. Under such conditions, zones or channels of high permeability are formed causing the combustion process to occur primarily in these locations. After burning is effected in this manner for a time, e.g., several months, the process may be discontinued and the heat thus generated allowed to diffuse throughout the oil-bearing formation, increasing the average temperature thereof, for example, to about 200° F. Under these circumstances, the oil is in a condition such that any of the above-mentioned conventional methods may be used to recover the resulting oil of reduced viscosity.

Alternatively, the formation may be fractured prior to establishment of a combustion front in the injection well. The fracturing oepration may be carried out in accordance with known methods employing as fracturing fluids materials such as water, air, or special fluids with or without propping agents. While fractures are created in consolidated formations, we do not definitely know what happens when petroleum deposits in unconsolidated formations, such as tar sands, are subjected to fracturing conditions. We do know, however, that zones or channels of higher permeability exist throughout the formation between injection and producing wells after the formation has been subjected to fracturing conditions than existed prior to such treatment. These fractures are preferably placed at a number of different levels and when they have been produced, as is frequently evidenced by a sharp drop in injection pressure, the face of the formation adjacent the injection well is ignited. To sustain the resulting combustion front and drive it out into the formation for a distance sufficient to raise the temperature thereof to about 200° F., relatively high surface air injection pressures are employed. In general, it may be said that the pressure required at this point in our process is that necessary to keep the front moving out into the reservoir. For example, in tar sands at a depth of about 1000 feet, such pressure will be found to range from about 1200 to 1500 p.s.i. Combustion at these high pressures occurs primarily in the fractures or zones of increased permeability and is continued until a temperature increase is observed in the producing well, indicating that the combustion front in each of the one or more of said zones of higher permeability has reached or is approaching the immediate vicinity of the producing well. The occurrence of such a temperature rise may require several months. Once this heating period—which may require several months—has been completed, and the formation temperature between input and output wells has been increased to a level of at least about 200° F., the viscosity of the tar or oil is such that flow of fluids through the reservoir can usually be maintained at fluid pressures of from about 600 to about 800 p.s.i. The flow of oil into the producing well may or may not be accompanied or aided by steam injection into the latter in accordance with the procedure described herein.

The method of our invention may be further illustrated by reference to the accompanying drawing in which cased input and output wells 2 and 4, respectively, penetrate a heavy oil-bearing formation 6 at a depth of about 850 feet. After the oil is ignited in accordance with any of the presently known methods at the face of well 2 through perforations 8, air is injected into formation 6 via tubing 10 at a pressure, for example, of 1000 to 1300 p.s.i. Under these conditions narrow channels 12 of high permeability are created. After the combustion front is moved out away from well 2 for a distance of, for example, 3 to 5 feet, as generally shown by a shaded area 14, air injection is temporarily halted and steam at about 800 p.s.i. and 500° F. is injected into formation 6 through tubing 16 and perforations 18 for a period of, for example, 3 to 5 weeks, to create the heated area designated as 20. The oil in this portion of the reservoir after it has been heated by steam, is of relatively low viscosity, i.e., 30 c.p.s. After placing well 4 on production, the oil flows readily into the latter through gravity drainage and as the result of the condensate formed flashing again into steam when well 4 is depressured and placed on production. At the time production is initiated in well 4, the introduction of air into the formation through tubing 10 is resumed to continue the movement of burning zone 14 toward the producing well. The inert gaseous products flowing in the direction indicated by the arrows and formed from the combustion operation, supply additional energy to force oil from heated area 20 into well 4. During the steam injection interval—when the combustion operation may be discontinued—heat which is generated in and near burning zone 14 diffuses out into the unburned portion of the formation, heating the oil and rendering it less viscous. On resumption of the burning operation, such oil of lowered viscosity, at least to some extent, is moved toward steam treated area 20. This heating period also serves to reduce the tendency for hot oil and steam from the combustion step to be cooled when contacted by reservoir rock since a large volume of the latter during the above-mentioned 3- to 5-week steam injection period has been heated to a temperature of 150° to 200° F. In any event, after well 4 is depressured the energy supplied in the aforesaid manner serves to force the oil into well 4 from which it is removed through tubing 16.

It is to be specifically understood that the process of our invention is not necessarily limited to oils characteristic of those reservoirs in which forward combustion can be conducted by conventional methods. On the contrary, it is applicable in any reservoir in which the oil ranges in viscosity and gravity typical of tar, to crude oil having an API gravity of 40°.

Although we have pointed out that we prefer to discontinue combustion while the producing well is placed on production, our invention contemplates a process in which combustion is effected simultaneously with the production cycle.

For the purposes of this description, the expression "heavy oil" is intended to mean a crude having an API gravity less than 20°.

While we have stressed the applicability of our invention to reservoirs having formation pressures not in excess of about 150 p.s.i., we would like to point out that it is also suitable for use in higher pressure reservoirs.

We claim:

1. In a method for recovering petroleum from an underground reservoir thereof having little or no natural energy and wherein said reservoir is penetrated by an injection well and a producing well, the improvement which comprises establishing a burning zone in said reservoir at the face of said injection well, introducing an oxygen-containing gas into said reservoir via said injection well to move said zone toward said producing well and to generate gaseous production products, injecting steam into said reservoir via said producing well to reduce the viscosity of the petroleum in the vicinity of said producing well, thereafter reducing the pressure on said reservoir by placing said producing well on production while introducing oxygen-containing gas into said reservoir via said injection well to propagate said burning zone toward said producing well and recovering petroleum from the latter.

2. The method of claim 1 in which the oxygen-containing gas is injected continuously.

3. In a method for recovering petroleum from an underground reservoir thereof having little or no natural energy and wherein said reservoir is penetrated by an injection well and a producing well, the improvement which comprises establishing a burning zone in said reservoir at the face of said injection well, introducing air into said reservoir via said injection well to propagate said zone no more than about 5 feet away from said injection well, introducing steam under pressure into said reservoir via said producing well while discontinuing the introduction of air via said injection well, thereafter discontinuing said steam injection step, reducing the pressure on said producing well and placing the latter on producing while the introduction of air into reservoir through said injection well is resumed, and recovering petroleum from said producing well.

4. The method of claim 3 in which the petoleum has an API gravity of from about 20° to 40°.

5. In a method for recovering heavy oil from an underground reservoir thereof having little or no natural energy and wherein said reservoir is penetrated by an injection well and a producing well, the improvement which comprises establishing a burning zone in said reservoir at the face of said injection well, introducing air into said reservoir via said injection well at a pressure sufficient to lift the overburden on said reservoir and to propagate said zone toward said producing well, discontinuing said air injection step thereby permitting the heat thus generated to diffuse out into said reservoir to reduce the viscosity of said oil, introducing steam under pressure into said reservoir via said producing well while discontinuing the introduction of air via said injection well, whereby to heat and lower the viscosity of the oil in the vicinity of said producing well, thereafter discontinuing said steam injection step, reducing the pressure on said producing well and placing the latter on production while the introduction of air under the aforesaid pressure into reservoir through said injection well is resumed, and recovering the resulting oil of reduced viscosity from said producing well.

6. In a method for recovering petroleum from an underground tar sand deposit wherein said deposit is penetrated by an injection well and a producing well, the improvement which comprises establishnig a burning zone in said deposit at the face of said injection well, thereafter introducing air into said deposit via said injection well at a pressure sufficient to lift the overburden on said deposit to create channels of increased permeability therein and to simultaneously propagate said zone through said channels toward said producing well and continuing combustion under these conditions until a temperature increase is observed in the producing well, thereafter discontinuing air injection under the aforesaid pressure conditions, permitting the heat thus generated to diffuse through said reservoir, next subjecting said reservoir while the oil therein is still in a heated condition to the action of a conventional secondary recovery method, and recovering oil therefrom via said producing well.

7. In a method for recovering petroleum from an underground reservoir thereof wherein said reservoir is penetrated by an injection well and a producing well, the improvement which comprises establishing a burning zone in said reservoir at the face of said injection well, introducing air into said reservoir via said injection well at a pressure sufficient to lift the overburden on said reservoir and to propagate said zone toward said producing well, discontinuing said air injection step thereby permitting the heat thus generated to diffuse out into said reservoir to reduce the viscosity of said oil, introducing steam under pressure into said reservoir via said producing well while discontinuing the introduction of air via said injection well, whereby to heat and lower the viscosity of the oil in the vicinity of said producing well, thereafter discontinuing said steam injection step, reducing the pressure on said producing well and placing the latter on production while the introduction of air under the aforesaid pressure into reservoir through said injection well is resumed, and recovering the resulting oil of reduced viscosity from said producing well.

8. The method of claim 7 in which the formation pressure of said reservoir is above 150 p.s.i.

9. In a forward combustion method for recovering petroleum from an underground tar sand deposit wherein said deposit is penetrated by an injection well and a producing well, the improvement which comprises introducing a fluid into a portion of said deposit at a pressure sufficient to lift the overburden on said deposit to create channels of increased permeability in said deposit and between said wells, thereafter establishing a burning zone in said deposit at the face of said injection well and adjacent said channels, next introducing an oxygen-containing gas into said injection well and then into said deposit at a pressure sufficient to maintain said channels of increased permeability while propagating said zone through said channels toward said producing well, discontinuing the injection of said gas into said deposit and allowing the resulting heat to diffuse out into said deposit until that portion thereof between said injection and producing wells is at a temperature of at least about 200° F., thereafter subjecting said deposit while the petroleum is still in a heated condition to the action of a conventional secondary method, and recovering petroleum therefrom via said producing well.

10. The method of claim 9 wherein the conventional secondary recovery method used is forward combustion involving air and water injection.

11. The method of claim 9 wherein said burning zone is propagated through said zone of increased permeability until said burning zone arrives at the immediate vicinity of said producing well.

12. The method of claim 6 wherein said burning zone is propagated through said channels of increased permeability until said burning zone arrives at the immediate vicinity of said producing well.

*13. In a method for the recovery of petroleum from an underground reservoir thereof, said reservoir being of the type formerly considered unadaptable to oil recovery by forward combustion, said reservoir being penetrated by an injection well and a producing well, the improvement which comprises introducing a fluid into a portion of said reservoir at a pressure sufficient to lift the overburden on said reservoir to create channels of increased permeability in said reservoir and between said wells, thereafter establishing a burning zone in said reservoir at the face of said injection well and adjacent said channels, thereafter conducting a high pressure forward combustion step in said reservoir by introducing an oxygen-containing gas into said injection well and then into said reservoir at a pressure sufficient to lift said overburden whereby said zone is propagated through said reservoir forcing oil of reduced viscosity ahead of said zone toward said producing well, and recovering petroleum from said producing well.*

*14. The method of claim 13 wherein said reservoir is a tar sand deposit.*

*15. The method of claim 13 wherein the forward combustion step is continued until a temperature increase is observed in the vicinity of said producing well.*

*16. The method of claim 13 wherein the fluid employed to lift the overburden is air.*

*17. In a method for the recovery of petroleum from an underground reservoir thereof, said reservoir being of the type formerly considered unadaptable to oil recovery by forward combustion, said reservoir being penetrated by an injection well and a producing well, the improvement which comprises establishing a burning zone in said reservoir at the face of said injection well, thereafter conducting a high pressure forward combustion step in said reservoir by introducing an oxygen-containing gas into said injection well and then into said reservoir at a pressure sufficient to lift said overburden whereby said zone is propagated through said reservoir forcing oil of reduced viscosity ahead of said zone toward said producing well, and recovering petroleum from said producing well.*

*18. The method of claim 17 wherein said reservoir is a tar sand deposit.*

(References on following page)

References Cited

The following references, cited by the Examiner, are of record in the patented file of this patent or the original patent.

UNITED STATES PATENTS

| | | | |
|---|---|---|---|
| 2,901,043 | 8/1959 | Campion et al. | 166—11 |
| 3,036,632 | 5/1962 | Koch et al. | 166—11 |
| 3,064,728 | 11/1962 | Gould | 166—2 |
| 3,111,986 | 11/1963 | Kuhn | 166—11 |

| | | | |
|---|---|---|---|
| 3,138,202 | 6/1964 | Ewing et al. | 166—11 X |
| 3,171,479 | 3/1965 | Parrish et al. | 166—11 |
| 3,179,167 | 4/1965 | Strange et al. | 166—11 |
| 3,180,414 | 4/1965 | Parker | 166—29 |
| 3,246,693 | 4/1966 | Crider | 166—11 |
| 3,284,281 | 11/1966 | Thomas | 166—11 X |
| 3,342,258 | 9/1967 | Prats | 166—11 |

STEPHEN J. NOVOSAD, Primary Examiner

Disclaimer

Reissue No. 26,773.—*Karol L. Hujsak*, Tulsa, *Howard Grekel*, Claremore, and *Richard Mungen*, Tulsa, Okla. PRODUCING PETROLEUM BY FORWARD COMBUSTION AND CYCLIC STEAM INJECTION. Reissue patent dated Jan. 20, 1970. Disclaimer filed July 17, 1970, by the assignee, *Pan American Petroleum Corporation*.

Hereby enters this disclaimer to claims 1 and 2 of said patent.

[*Official Gazette December 1, 1970.*]